(12) United States Patent
Meyer et al.

(10) Patent No.: US 12,512,971 B2
(45) Date of Patent: Dec. 30, 2025

(54) PROCESSING OF CRYPTOGRAPHIC DATA

(71) Applicant: Infineon Technologies AG, Neubiberg (DE)

(72) Inventors: Bernd Meyer, Munich (DE); Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 202 days.

(21) Appl. No.: 18/207,906

(22) Filed: Jun. 9, 2023

(65) Prior Publication Data

US 2023/0412370 A1 Dec. 21, 2023

(30) Foreign Application Priority Data

Jun. 17, 2022 (DE) .......................... 102022115195.6

(51) Int. Cl.
*H04L 29/06* (2006.01)
*H04L 9/08* (2006.01)

(52) U.S. Cl.
CPC .................................... *H04L 9/085* (2013.01)

(58) Field of Classification Search
None
See application file for complete search history.

(56) References Cited

U.S. PATENT DOCUMENTS

| | | | |
|---|---|---|---|
| 5,596,763 A * | 1/1997 | Guttag | G06F 7/575 708/670 |
| 6,658,578 B1 * | 12/2003 | Laurenti | G06F 9/3856 712/E9.032 |
| 7,676,037 B2 * | 3/2010 | Jung | G06F 7/725 713/168 |
| 8,199,909 B2 * | 6/2012 | Dottax | H04L 9/002 380/28 |
| 8,290,145 B2 * | 10/2012 | Neisse | H04L 9/003 713/168 |
| 9,910,971 B2 * | 3/2018 | Johnson | G06F 21/14 |
| 2010/0166177 A1 * | 7/2010 | Sirio | H04L 9/003 380/30 |
| 2010/0281092 A1 * | 11/2010 | Kuenemund | G06F 7/5016 708/490 |
| 2015/0110266 A1 * | 4/2015 | Debraize | H04L 9/3242 380/30 |

(Continued)

FOREIGN PATENT DOCUMENTS

| | | |
|---|---|---|
| DE | 10341096 A1 | 3/2005 |
| DE | 102021003275 B3 | 7/2022 |

OTHER PUBLICATIONS

Goubin, Louis, "A Sound Method for Switching between Boolean and Arithmetic Masking", Proceedings of CHES'2001, LNCS 2162, 2001, 1-15.

(Continued)

*Primary Examiner* — Maung T Lwin
(74) *Attorney, Agent, or Firm* — Murphy, Bilak & Homiller, PLLC

(57) ABSTRACT

Solutions described herein refer to cryptographic data processing, utilizing a first masking scheme of a shared secret and a second masking scheme of the shared secret, wherein a transformation from the first masking scheme to the second masking scheme is conducted by forcing one type of calculation among at least two types of calculations.

19 Claims, 3 Drawing Sheets

(56) References Cited

U.S. PATENT DOCUMENTS

| 2015/0222421 A1* | 8/2015 | Guo | H04L 9/003 |
| | | | 380/28 |
| 2019/0050601 A1* | 2/2019 | Zeh | G06F 7/588 |
| 2021/0406406 A1* | 12/2021 | Hutter | G06F 7/764 |
| 2022/0014355 A1* | 1/2022 | Gama | H04L 63/04 |

OTHER PUBLICATIONS

Vadnala, Praveen Kumar, et al., "Algorithms for Switching between Boolean and Arithmetic Masking of Second Order", University of Luxembourg, Laboratory of Algorithmics, Cryptology and Security (LACS), 2013, 1-16.

* cited by examiner

PROCESSING OF CRYPTOGRAPHIC DATA

TECHNICAL FIELD

Examples described herein relate to the protection of implementations of cryptographic algorithms against side channel attacks.

BACKGROUND

Cryptographic algorithms can be protected against side channel attacks by masking intermediate data. Such masking is possible if the fundamental operations used in a given algorithm can be rewritten with masked input data, providing masked output data, which works well for algorithms like DES or RSA. However, in algorithms that combine Boolean and arithmetic functions, like IDEA, AES, or several hash algorithms, two different kinds of masking were used. This results in a need for a conversion between Boolean masking and arithmetic masking and vice versa.

In this context, [1] discloses two algorithms for such a conversion, which provides an improved protection against Differential Power Analysis (DPA) attacks.

SUMMARY

An objective of several embodiments described herein is to improve existing solutions and in particular to reduce the likelihood of a successful side channel attack.

This problem is solved according to the features of the independent claims. Further embodiments result from the dependent claims.

The examples suggested herein may in particular be based on the following solution. In particular combinations of the following features could be utilized in order to reach a desired result. The features of the method could be combined with any feature(s) of the device, apparatus or system or vice versa.

An example method for cryptographic data processing is suggested, the example method comprising the steps of utilizing a first masking scheme of a shared secret and a second masking scheme of the shared secret, wherein a transformation from the first masking scheme to the second masking scheme is conducted by forcing one type of calculation among at least two types of calculations.

Cryptographic data processing refers to any processing of data that are at least in part subject to a secure application. The cryptographic data may comprise a shared secret (e.g., key) or any information that should be kept hidden from any side-channel attack. It is noted that the cryptographic data may be secret data or they may contribute to secret data.

There may exist a multitude of types of calculation. In an example, references herein to a "type" of calculation may refer to a type of calculation that results in a set carry bit ($c=1$). Another type of calculation may result in the carry bit not being set ($c=0$). In other words, a processing may comprise two types of calculations, one with the carry bit being set and one without the carry bit being set. Forcing one type of calculation in particular refers to a scenario which always results in selecting one of the several types of calculation. This may, e.g., result in the carry-bit always being set. This can be forced, e.g., by supplementing data that are input to an addition with most significant bits amounting to 1. In such a case, the result of the addition, will always lead to a set carry bit. In this example, the path chosen by the addition always runs through the type of calculation with the set carry bit.

According to an embodiment, statistics over the occurrences of the at least two types of calculations provide side channel information on the shared secret.

According to an embodiment, the method comprises (at least) the following types of calculations:
a first type of calculation that leads to a set carry bit and
a second type of calculation that does not lead to a set carry bit.
wherein the first type of calculation or the second type of calculation is forced to be executed.

By forcing the first type of calculation, the carry bit is always set. Hence, any side channel attack cannot obtain any hint towards the shared secret based on the deterministically set carry bit ($c=1$).

According to an embodiment, one of the following applies:
the first masking scheme is a Boolean masking scheme and the second masking scheme is an arithmetic masking scheme; or
the first masking scheme is an arithmetic masking scheme and the second masking scheme is a Boolean masking scheme.

According to an embodiment, the shared secret is encoded in the Boolean masking scheme such that the transformed arithmetic masking scheme of the shared secret always leads to a set carry bit.

According to an embodiment, the result of the arithmetic masking scheme is determined by subtracting a constant from one of the arithmetic components that are used to determine the shared secret.

According to an embodiment,
the Boolean masking scheme uses parameters x and r to define the shared secret s according to $$s=x \oplus r;$$

the arithmetic masking scheme uses a parameter a and the parameter r to define the shared secret s according to $$s=a+r \bmod 2^n,$$

wherein n is the bit-length of the parameters.

According to an embodiment,
at least one of the parameters a, s, x and r is extended by at least one bit from the length n to the length n+1,
each of the parameters x and r is prepended by at least one "1".

It is noted that a single bit or more than one bit can be used for such extension.

For example, x and r may each be prepended by m bits. A transformation is then conducted with values of a length amounting to n+m resulting in a value mod $2^{n+m}$. Then, $X=vx$ and $R=vr$ with v being an m-bit number, which is different from 0 (i.e., having at least one 1).

Hence, the Boolean masking scheme applied to the new parameters X and R results in a new shared secret $S=X \oplus R=0s$, which still represents the secret s, because the MSB of the secret S is always 0. This MSB, however, is neither to be kept secret nor is it correlated to any portion of the shared secret s.

According to an embodiment, the transformation to the arithmetic masking scheme is conducted such that the equation $$s=A+R \bmod 2^{n+1}$$

is fulfilled.

According to an embodiment, the transformation is based on Goubin's "Algorithm 1" as disclosed in [1].

According to an embodiment, the method is used or executed on a security device, wherein such security device comprises at least one of the following:
- an integrated circuit,
- a hardware security module,
- a trusted platform module,
- a crypto unit,
- a FPGA,
- a processing unit,
- a controller,
- a smartcard.

Also, a device is suggested for cryptographic data processing comprising a processing unit that is arranged
- for utilizing a first masking scheme of a shared secret and a second masking scheme of the shared secret,
- wherein a transformation from the first masking scheme to the second masking scheme is conducted by forcing one type of calculation among at least two types of calculations.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

In addition, the problem stated above is solved by a computer-readable medium, e.g., storage of any kind, having computer-executable instructions adapted to cause a computer system to perform the method as described herein.

According to an embodiment, the device is a security device comprising at least one of the following:
- an integrated circuit,
- a hardware security module.
- a trusted platform module,
- a crypto unit,
- a FPGA,
- a processing unit,
- a controller,
- a smartcard.

The solution provided herein further comprises a computer program product directly loadable into a memory of a digital computer, comprising software code portions for performing the steps of the method as described herein.

BRIEF DESCRIPTION OF THE FIGURES

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
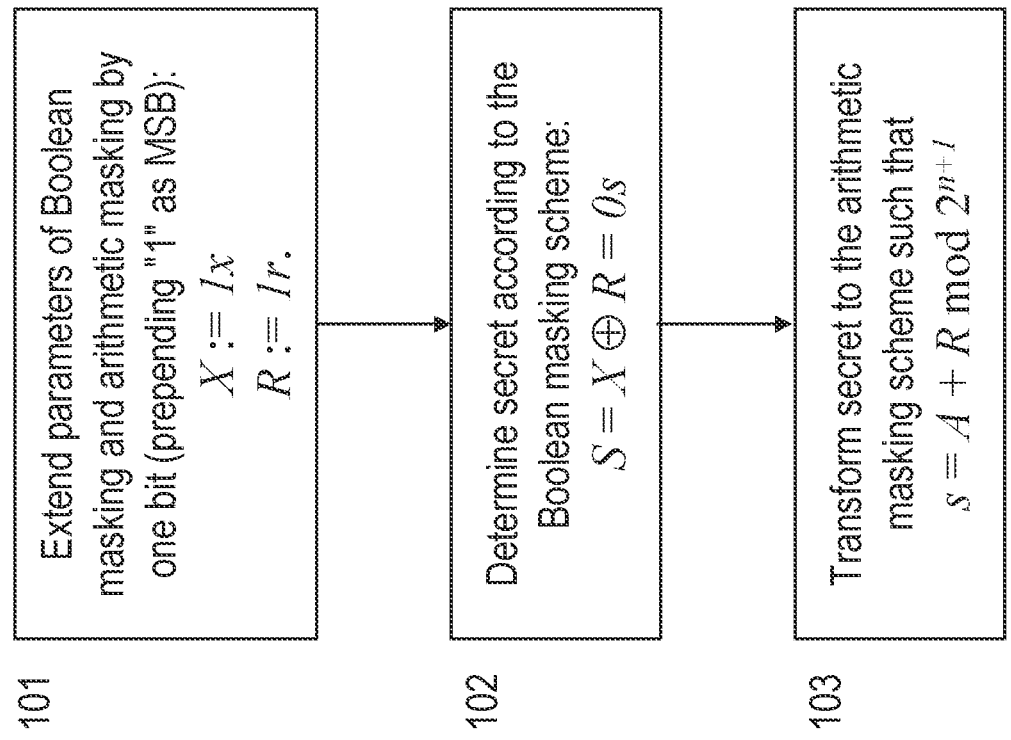
FIG. 1 shows a schematic diagram visualizing the concept of a transformation from the Boolean masking scheme to the arithmetic masking scheme utilizing the carry bit.

Masking secret data by computing random shared representations is a commonly used technique to protect computer implementation of cryptographic algorithms against side-channel attacks. A randomness that is added to the masking decreases the likelihood of attacks that are based on statistical analysis of observable information obtained from the attacked physical device (e.g., computer system) from being successful. Without such randomness, the statistical analysis of, e.g., power consumption and/or electromagnetic radiation might be exploited in a successful side-channel attack towards the device. The attack may be directed to derive statistical patterns that may reveal hints towards, e.g., a secret key or processed secret data. For more details about side channel attacks, in particular differential power analysis (DPA) attacks, reference is made to, e.g., https://en.wikipedia.org/wiki/Power_analysis.

It is a common problem that no compact shared representation is known which is simultaneously homomorphic with all operations available in the instruction set of a typical processor, i.e., Boolean operations (AND, OR, NOT, XOR, SHIFT, ROTATE) and arithmetic operations (ADD, SUB, MUL, MOD). Therefore, if an application needs to process shared secrets, it is often necessary to repeatedly change between a masking scheme that is compatible with Boolean operations and a masking scheme that is compatible with arithmetic operations. Transforming randomly shared data is a computationally expensive step with a significant impact on the performance. Also, the transformations themselves may have to be hardened against side-channel attacks.

Examples described herein are in particular directed to an improved carry correction for Goubin's DPA resistant algorithm (see [1], referred to as "BooleanToArithmetic") for transforming Boolean to arithmetic masking if the shared data represents an integer in a residual ring or finite field.

Let $$0 \leq a, x, r, s < 2^n$$

be integers represented by bit strings of a length n>0.

A term $$x \oplus r$$

refers to an n-bit string resulting from the bit-wise exclusive-or (XOR) operation of the strings x and r.

Further, a term $$a + r$$

refers to an n-bit string representing the integer sum of the values represented by a and r modulo $2^n$.

A "BooleanToArithmetic" algorithm from [1], also referred to as "Algorithm 1" converts a random Boolean masking representing a secret s to a random arithmetic masking of the same secret s:

Input: Boolean masking (x, r) for a shared secret s=x⊕r
Output: Arithmetic masking (a, r) satisfying s=a+r mod $2^n$
1) set γ to a randomly chosen n-bit string representing the value 0≤γ<$2^n$
2) set t←x⊕γ
3) set t←t−γ
4) set t←t⊕x
5) set γ←γ⊕r
6) set a←x⊕γ
7) set a←a−γ
8) set a←a⊕t It is noted that the value r is used in both masking schemes and it is not changed during the algorithm. Therefore, if the value r is randomly chosen and (x, r) is a Boolean masking of a shared secret s with x=s⊕r, then (a, r) is a random arithmetic masking of the shared secret s satisfying $$s=a+r-c\cdot 2^n$$

over the integers, with a carry c, wherein in particular the following may apply for the carry c:

$$c = \begin{cases} 0 & \text{if } r \leq s \\ 1 & \text{otherwise} \end{cases}$$

Often, the length n of the shares is set to the operand size (e.g., 32 bit or 64 bit) of a device (e.g., a CPU) executing Algorithm 1. In this case, arithmetic operations on the device are done implicitly modulo $2^n$ and it is not necessary to consider or correct the carry c.

This Algorithm 1 as disclosed in [1] provides some security against side-channel attacks as the probability distributions of all intermediate result are no longer correlated to the shared secret s.

However, this level of security may not apply for the carry c: If the carry c of the arithmetic masking (a, r) is computed during the execution of Algorithm 1 (e.g., as status flag of the CPU executing arithmetic operations) then the carry c is generated if r>s. Hence, a probability Pr of the carry c not occurring (i.e., c=0) for a randomly chosen value r is proportional to the value of the shared secret s:

$$Pr(c=0) = \frac{s+1}{2^n}.$$

If an attacker is able to observe whether c=0 during repeated computations of the application with the same s, he can use a relative frequency h of the event carry c=0 as an approximation for the secret s, since the relative frequency h is an unbiased estimator for the equivalent secret value $(s+1)/2^n$. If an occurring carry c can be observed d-times in m repetitions of the application, the relative frequency $$h = \frac{m-d}{m}$$

exposes the $\log_2(m)$ most significant bit (MSB) of the secret s. In other words, the occurring carry is correlated to the MSB of the secret s.

This situation gets worse if the secret s is an integer representing a secret chosen from a residual ring or finite field Z/wZ (e.g., a private key of a discrete log based public-key cryptosystem). In such a scenario, the following applies:

$$s \equiv a+r-c\cdot \eta \mod w,$$

wherein $$\eta := 2^n \mod w$$

is a constant and can be precomputed.

Hence, for further computations modulo w using the arithmetic share (a, r) of the secret s, it is necessary to compute the carry c and correct intermediate results by the constant η dependent on the carry c. This computation of the carry c and then conditionally subtracting the constant η from one of the arithmetic shares a or r is difficult to hide and can lead to a serious threat to the side-channel security of the application. It also results in a data dependent, non-uniform program flow.

Examples described herein in particular suggest an extension of this Algorithm 1 thereby avoiding any conditional correction of intermediate values representing an arithmetic share of a secret s from a residual ring or finite field Z/wZ.

This can be achieved by encoding the secret s in the Boolean masking (x, r) in such a way that the corresponding arithmetic masking (a, r) computed by Algorithm 1 always leads to a carry. In such a case, the following applies:

$$s=a+\eta \mod w,$$

with $$\eta = 2^n \mod w.$$

The correction of the modular result of the arithmetic masking can be done by subtracting the constant η from one of the arithmetic shares a or r. This step is no longer conditional and the program flow is now data independent.

In order to always enforce a carry occurring in the represented integer value of the arithmetic sharing, the following changes may apply:
(1) All parameters of Boolean masking and arithmetic masking are extended by (at least) one bit from length n to n+1.
(2) In the original Boolean masking (x, r) for a shared secret s=x⊕r, each of the parameters x and r is prepended with 1 bit as most significant bit (MSB)

$$X:=1x,$$

$$R:=1r.$$

It is noted that the new Boolean masking (X, R) yields a secret $$S=X \oplus R=0s,$$

which still represents the integer value s. The most significant bit of the (new) secret S is always zero. This initial bit, however, is neither a secret nor correlated to secret data.

Hence, Algorithm 1, applied with n substituted by n+1, transforms the Boolean masking (X, R) to the arithmetic masking (A, R) satisfying $$s=A+R \mod 2^{n+1}.$$

As the same value R is used in the Boolean and arithmetic masking and because $$R>s=S,$$

the case c=1 applies.

This approach reduces the visibility of a conditional subtraction of the correction value η and leads to a uniform, data independent program flow.

By extending the length of the used representations by (at least) one bit, it is possible to transform the masking schemes such that the integer value of the secret in the Boolean masking does not change, but the integer value in the arithmetic masking always produces an overflow, which is then corrected.

FIG. 1 shows a schematic diagram visualizing the concept of a transformation from the Boolean masking scheme to the arithmetic masking scheme utilizing the carry bit as described above.

In a step 101, the Boolean masking and the arithmetic masking are extended by prepending a bit "1" as MSB to the parameters x and r. This results in a new shared secret S with an MSB "0" (see step 102). In a step 103, the transformation in the arithmetic masking domain is conducted such that the equation $$s = A + R - 2^{n+1}$$

is fulfilled.

It is an option that s and/or r may be extended by more than a single bit, e.g., m bits. Advantageously, X and R are identical in the upper m bits (i.e., the most significant m bits) in order to obtain S=s. Further, at least one of the m bits needs to be set in order to obtain R>s=S thereby forcing c=1.

Figure 2:
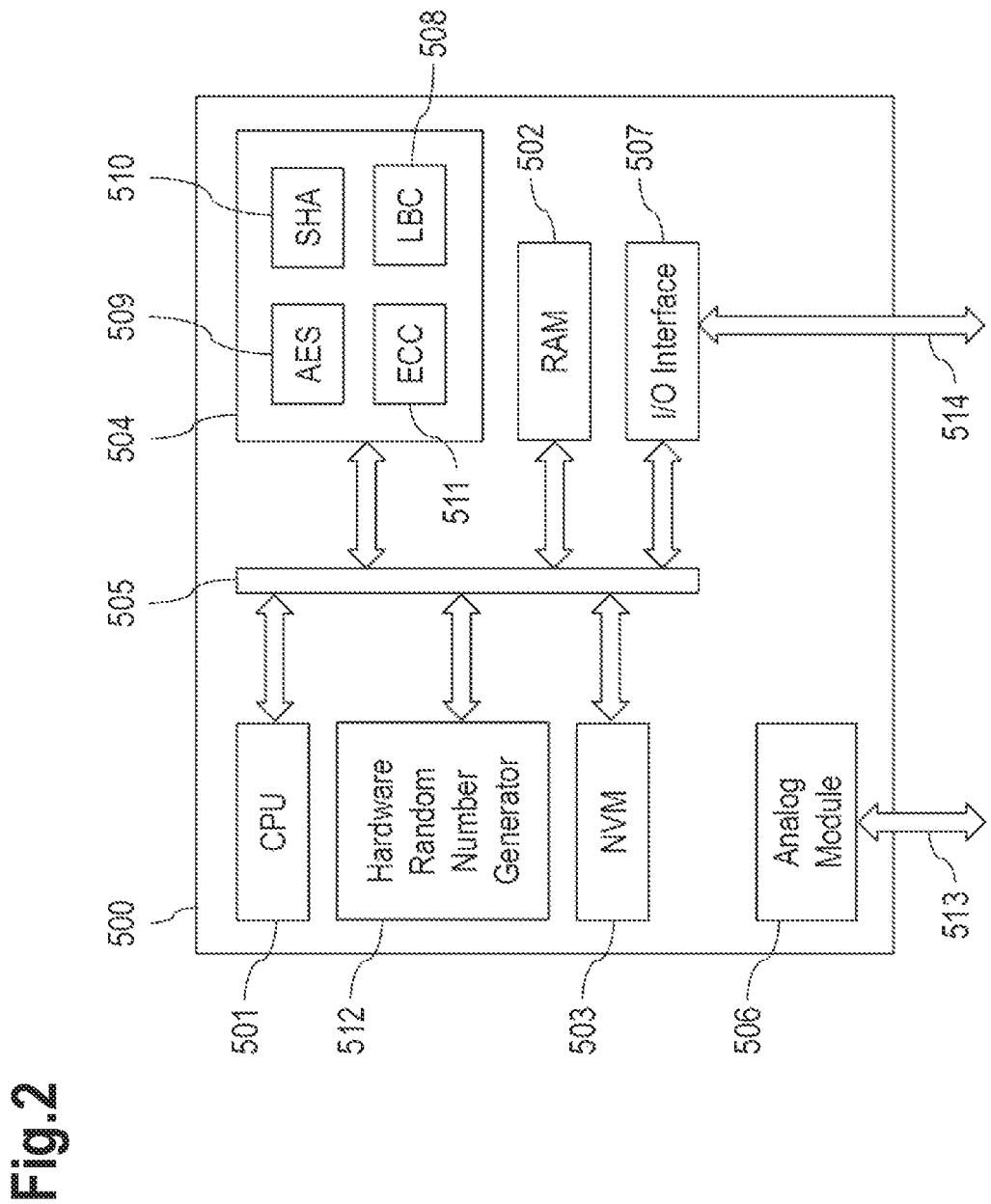
FIG. 2 shows an exemplary arrangement of a processing device comprising a CPU, a RAM, a non-volatile memory, a crypto module, an analog module, an input/output interface and a hardware-random number generator.

FIG. 2 shows a processing device 500 comprising a CPU 501, a RAM 502, a non-volatile memory 503 (NVM), a crypto module 504, an analog module 506, an input/output interface 507 and a hardware-random number generator 512.

In this example, the CPU 501 has access to at least one crypto module 504 over a shared bus 505 to which each crypto module 504 is coupled. Each crypto module 504 may in particular comprise one or more crypto cores to perform certain cryptographic operations. Exemplary crypto cores are:
- an AES core 509,
- a SHA core 510,
- an ECC core 511, and
- a lattice-based crypto (LBC) core 508.

The lattice-based crypto core 508 may be provided in order to conduct or accelerate lattice-based cryptography.

The CPU 501, the hardware random number generator 512, the NVM 503, the crypto module 504, the RAM 502 and the input/output interface 507 are connected to the bus 505. The input output interface 507 may have a connection 514 to other devices, which may be similar to the processing device 500.

The crypto module 504 may or may not be equipped with hardware-based security features. As an option, the crypto module 504 may comprise a random number generator.

The analog module 506 is supplied with electrical power 513 via an electrical contact and/or via an electromagnetic field. This power is supplied to drive the circuitry of the processing device 500 and may in particular allow the input/output interface to initiate and/or maintain connections to other devices via the connection 514.

The bus 505 itself may be masked or plain. Instructions to process the steps described herein may in particular be stored in the NVM 503 and processed by the CPU 501. The data processed may be stored in the NVM 503 or in the RAM 502. Supporting functions may be provided by the crypto modules 504 (e.g., expansion of pseudo random data). Random numbers may be supplied by the hardware-random number generator 512.

The processing device 500 may be a chip card powered by direct electrical contact or through an electro-magnetic field. The processing device 500 may be a fixed circuit or based on reconfigurable hardware (e.g., Field Programmable Gate Array, FPGA). The processing device 500 may be coupled to a personal computer, microcontroller, FPGA or a smart phone.

Figure 3:
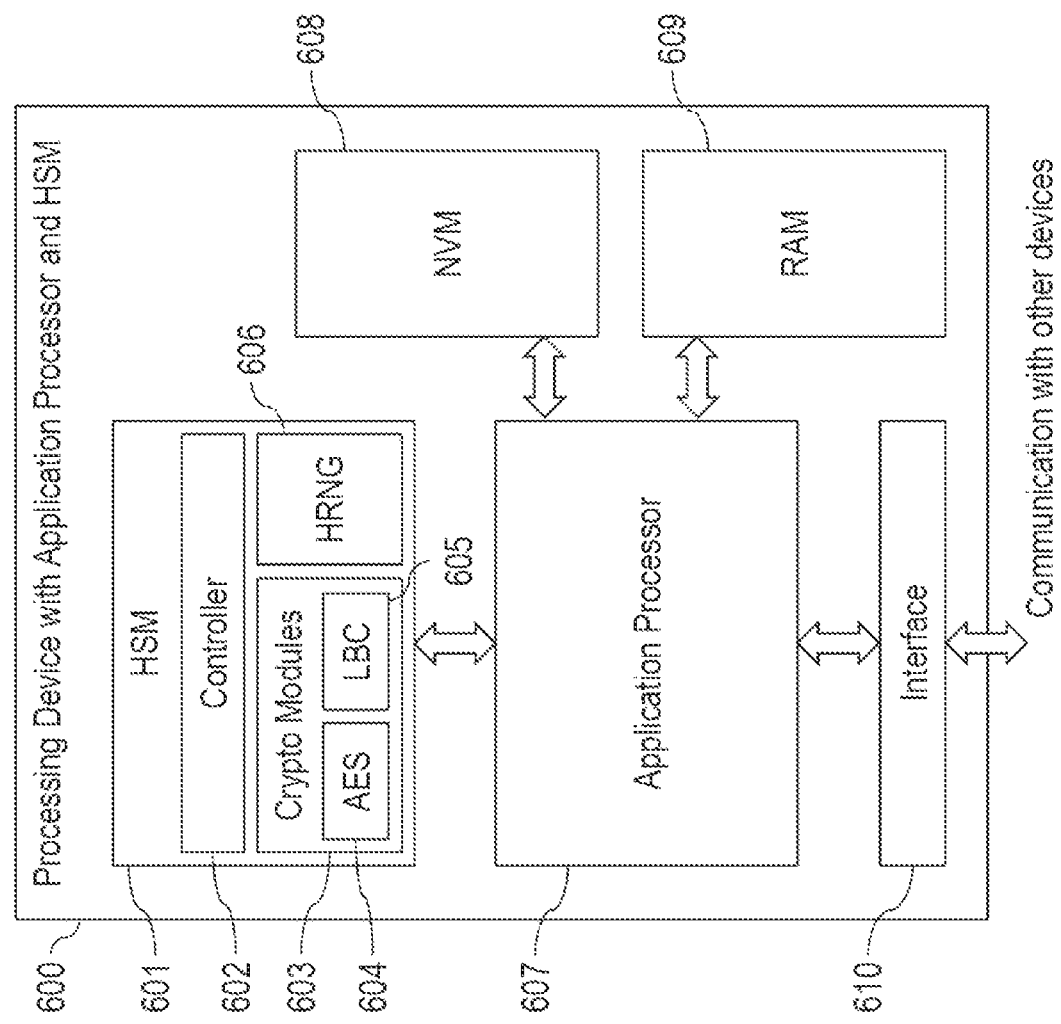
FIG. 3 shows an alternative arrangement with a hardware security module (HSM).

FIG. 3 shows another example of a processing device 600. The processing device 600 comprises a hardware security module (HSM) 601, a non-volatile memory (NVM) 608, a random access memory (RAM) 609, an interface 610 for communication with other devices and an application processor 607, which is coupled with the HSM 601, the RAM 609, the NVM 608 and the interface 610.

The HSM 601 comprises a controller 602, a hardware-random number generator (HRNG) 606 and at least one crypto module 603. The crypto module 603 exemplarily comprises an AES core 604 and a Lattice-based crypto (LBC) core 605.

According to one embodiment, the HSM 601 and the application processor 607 may be fabricated on the same physical chip with a tight coupling. The HSM 601 delivers cryptographic services and secured key storage while the application processor may perform computationally intensive tasks (e.g., image recognition, communication, motor control). The HSM 601 may be only accessible by a defined interface and considered independent of the rest of the system in a way that a security compromise of the application processor 607 has only limited impact on the security of the HSM 601. The HSM 601 may perform all tasks or a subset of tasks described with respect to the processing device 600 by using the controller 602, the LBC 605, supported by, exemplary, an AES 604 and the HRNG 606. It may execute the procedures described herein (at least partially) either controlled by an internal controller or as CMOS circuit. Moreover, also the application processor 607 may perform the procedures described herein (at least partially, e.g., in collaboration with the HSM 601).

The processing device 600 with this application processor 607 and HSM 601 may be used as a central communication gateway or (electric) motor control unit in cars or other vehicles.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

REFERENCE(S)

[1] L. Goubin, "A Sound Method for Switching between Boolean and Arithmetic Masking", Proceedings of CHES'2001, LNCS 2162, pp. 3-15, Springer-Verlag, 2001

The invention claimed is:

1. A method for providing improved security against side-channel attacks during cryptographic data processing in a processing circuit, the method comprising:
utilizing, in the processing circuit, a first masking scheme of a shared secret and a second masking scheme of the shared secret for operations performed with the shared secret in the processing circuit,
wherein each of multiple occurrences of a transformation from the first masking scheme to the second masking scheme for the shared secret is conducted by deterministically forcing one and the same type of transformation result selected from among at least two types of transformation results.

2. The method of claim 1, wherein the at least two types of transformation results comprise:
a first type of transformation result having a property according to which shares of the shared secret according to the first type of transformation result would generate a set carry bit if the shares were added; and
a second type of transformation result having a property according to which shares of the shared secret according to the second type of transformation result would not generate a set carry bit if the shares were added;
wherein said deterministically forcing comprises forcing the first type of transformation result for all of said transformations or forcing the second type of transformation result for all of said transformations.

3. The method of claim 1, wherein the first masking scheme is a Boolean masking scheme and the second masking scheme is an arithmetic masking scheme.

4. The method of claim 3, wherein the shared secret is encoded in the Boolean masking scheme in such a manner that the result of a transformation of the shared secret to an arithmetic masking scheme of the shared secret always yields a result of the transformation being shares of the shared secret that would generate a set carry bit if the shares were added.

5. The method of claim 3, wherein the result of the transformation to the arithmetic masking scheme is determined by subtracting a constant from one of the arithmetic shares of the shared secret.

6. The method of claim 3,
wherein the Boolean masking scheme uses shares x and r to define the shared secret s according to $$s = x \oplus r;$$

wherein the arithmetic masking scheme uses shares a and r to define the shared secret s according to $$s = a + r \bmod 2^n,$$

wherein n is the bit-length of each of the shares a, x, and r.

7. The method of claim 6,
wherein at least one of the shares a, x and r is extended by at least one bit from the length n to the length n+1, and
wherein each of the shares x and r is prepended by at least one "1".

8. The method of claim 7, wherein the transformation to the arithmetic masking scheme is conducted such that the equation $$s = A + R \bmod 2^{n+1}$$

is fulfilled, wherein A and R are the extended and/or prepended shares a and r, respectively.

9. The method of claim 1, wherein the transformation is based on Goubin's "Algorithm 1".

10. The method of claim 1, wherein the method is used or executed on a security device, wherein such security device comprises at least one of the following:
an integrated circuit,
a hardware security module,
a trusted platform module,
a crypto unit, a FPGA,
a processing unit,
a controller,
a smartcard.

11. A device for cryptographic data processing, the device comprising a processing circuit configured to:
utilize a first masking scheme of a shared secret and a second masking scheme of the shared secret for operations performed with the shared secret in the processing circuit,
wherein each of multiple occurrences of a transformation from the first masking scheme to the second masking scheme for the shared secret is conducted by deterministically forcing one and the same type of transformation result selected from among at least two types of transformation results.

12. The device of claim 11, wherein said device is a security device comprising at least one of the following:
an integrated circuit,
a hardware security module,
a trusted platform module,
a crypto unit,
a FPGA,
a processing unit,
a controller,
a smartcard.

13. The device of claim 11, wherein the at least two types of transformation results comprise:
a first type of transformation result having a property according to which shares of the shared secret according to the first type of transformation result would generate a set carry bit if the shares were added; and
a second type of transformation result having a property according to which shares of the shared secret according to the second type of transformation result would not generate a set carry bit if the shares were added;
wherein said deterministically forcing comprises forcing the first type of transformation result for all of said transformations or forcing the second type of transformation result for all of said transformations.

14. The device of claim 11, wherein the first masking scheme is a Boolean masking scheme and the second masking scheme is an arithmetic masking scheme.

15. The device of claim 14, wherein the processing circuit is configured to encode the shared secret in the Boolean masking scheme in such a manner that the result of a transformation of the shared secret to an arithmetic masking scheme of the shared secret always yields a result of the transformation being shares of the shared secret that would generate a set carry bit if the shares were added.

16. A non-transitory computer-readable medium comprising, stored thereupon, a computer program product directly loadable into a memory of a digital processing device, the computer program product comprising a software code portion configured so as to perform the steps of the method of claim 1 when executed by the digital processing device.

17. A method for providing improved security against side-channel attacks during cryptographic data processing in a processing circuit, the method comprising:
utilizing, for operations performed with a shared secret in the processing circuit, a representation of the shared secret according to a Boolean masking scheme and a representation of the shared secret according to an arithmetic masking scheme, such that the representation of the shared secret s is defined as $s = x \oplus r$ in the Boolean masking scheme and as $s = a + r \mod 2^n$ in the arithmetic masking scheme, a, x, and r being share parameters of the Boolean and arithmetic masking schemes and n being the length of the share parameters;
prepending each of the share parameters x and r of the Boolean masking scheme with at least one bit, to obtain extended share parameters X and R; and
transforming the representation of the shared secret according to the Boolean masking scheme to the representation of the shared secret according to the arithmetic masking scheme, using the extended share parameters X and R, thereby obtaining an extended share parameter A, the extended share parameter A being the share parameter a prepended by the at least one bit;
wherein said prepending is performed so as to force the value of R to be greater than the value of the shared secret s, thereby ensuring that the sum A+R always generates a carry.

18. The method of claim 17, wherein said prepending comprises prepending each of the share parameters x and r of the Boolean masking scheme with m bits, m being greater than one.

19. The method of claim 18, wherein said prepending each of the share parameters x and r of the Boolean masking scheme with m bits comprises prepending each of the share parameters x and r with the same m bits.

* * * * *